Patented Oct. 22, 1940

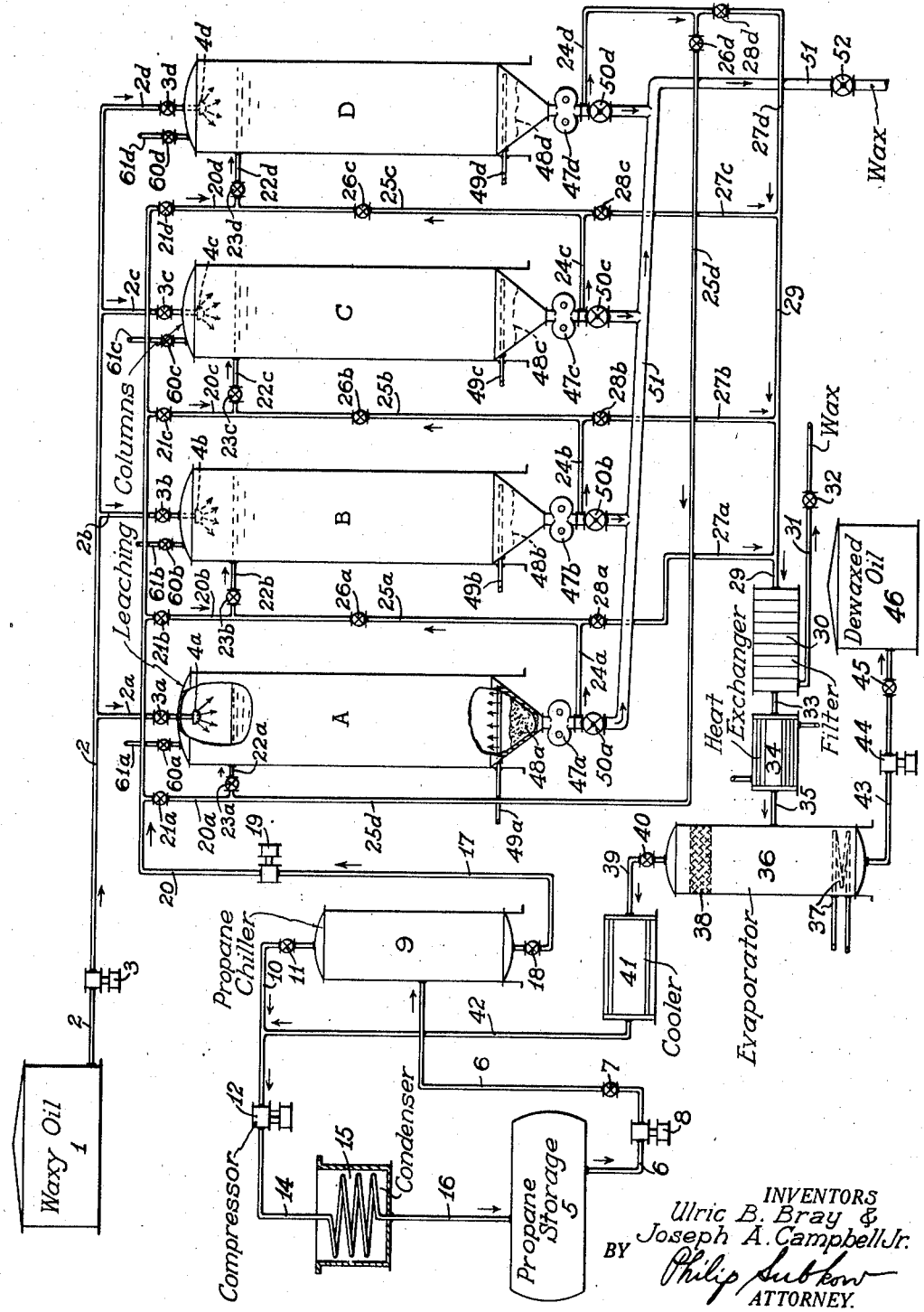

2,218,520

UNITED STATES PATENT OFFICE 2,218,520

PROCESS FOR DEWAXING OILS

Ulric B. Bray, Palos Verdes Estates, and Joseph A. Campbell, Jr., Los Angeles, Calif., assignors to Union Oil Company of California, Los Angeles, Calif., a corporation of California Application May 24, 1935, Serial No. 23,264

14 Claims. (Cl. 196—18)

The present invention relates to a process for separating asphalt and/or wax from petroleum oils. The invention relates particularly to a process for producing lubricating oil by separating the wax therefrom by a process corresponding to a leaching of the oil from solidified particles of wax and oil by means of a suitable solvent. This invention is also applicable to the separation of oil contained in waxes such as slack wax.

In co-pending applications, Bray, Serial No. 745,417, and Campbell, Serial No. 745,416, filed Sept. 25, 1934, processes were described for separating wax from oils involving spraying of the waxy oil into a cold solvent or diluent which is maintained in a leaching vessel at a wax crystallization temperature, say —40° F. whereupon the waxy oil is crystallized or solidified to form congealed masses of oil and wax. Upon continued contact of the solidified waxy oil particles, such as takes place when these particles settle gradually to the bottom of the container of chilled solvent, solution of the oil in the resulting solvent takes place corresponding to a leaching of the oil fractions from the wax matrices leaving the latter undissolved. The wax for the most part is obtained as large or coarse flakes which settle readily to the bottom of the vessel. To make the process continuous, the leaching solvent may be continuously introduced into the bottom of the vessel and the oil continuously sprayed in at the top and as the crystallized particles descend to the bottom of the vessel they contact the relatively purer solvent and are freed for the most part of the occluded oil in the wax matrices. The dewaxed oil solvent solution is continuously drawn off at the top of the vessel and passed to suitable recovery apparatus while the wax matrices are continuously drawn off at the bottom of the leaching vessel and also sent to a suitable recovery unit. The present invention relates to an improvement in this process.

We have discovered a desirable method of operation by filling the leaching vessel with cold leaching solvent to the desired level and subsequently spraying the waxy oil in at the top of the column. The droplets of waxy stock upon striking the cold solvent solidify into corn-flake-like particles, sometimes as pellets or discs and sink to the bottom of the vessel. This addition of waxy stock is continued until the leaching vessel is filled to the appropriate height with wax structures, generally to within a foot or so of the liquid level. A period of time is then allowed for leaching of the oil from the wax structures, this period varying with conditions of leaching, character of the leaching solvent and of the waxy stock and the form in which the waxy oil solidifies upon contact with the cold leaching solvent. Generally, however, from 15 minutes to two hours is allowed for the leaching solvent to leach the oil from the wax structures. At the end of the leaching period, the oil solvent solution is withdrawn from the bottom of the vessel and the wax structures in the leaching column are subjected to further leaching with fresh cold solvent introduced at the top of the column. The introduction of fresh solvent at the top of the column is preferably accomplished simultaneously with the withdrawal of solvent oil solution at the bottom and the introduction of the solvent and withdrawal of oil solvent solution is continued until substantially all of the oil is leached out of the wax structures.

The flow of solvent employed to leach the wax structures is preferably downward so as to reduce upward eddy currents due to differences in specific gravity as the solvent dissolves oil and becomes greater in density.

We have discovered that if the oil solvent solution separated from the wax matrices is withdrawn from the bottom of the leaching vessel instead of at the top, the oil recovered from the oil solvent solution withdrawn from the leaching vessel will have a lower pour point and will represent a greater yield of obtainable oil than by the operation of such aforementioned process. Also, the recovered wax will contain a lower quantity of oil and will have a higher melting point than the wax separated by employing the aforementioned up-flow leaching process.

We have further discovered that by employing a number of stages comprising a plurality of leaching columns so interconnected that the flow from the bottom of one leaching column may be diverted to the top of another, that an efficient leaching operation for separating wax from oils may be carried out with a minimum utilization of the leaching solvent. Briefly, this method consists in successively washing or leaching solidified oil-wax structures with chilled leaching solvent in such manner that the oil solvent solution withdrawn from the bottom of the leaching columns are transferred from wax structures of lower oil content to wax structures of higher oil content. In the first stage of the process which contains the wax structures of lowest oil content, substantially pure leaching solvent is employed. The last stage of the process contains wax structures of highest oil content but the oil solvent solution introduced into this stage contains the highest oil content and the oil solvent solution withdrawn from this last stage is sent to production, i. e., to the solvent recovery units where the solvent is stripped from the dewaxed oil to produce the finished product.

In carrying out the plural stage leaching process of our invention, the process is initiated as follows: With all columns empty but purged by air, the first stage or first leaching column is filled with fresh leaching solvent, as, for example, liquid propane at $-40°$ F. and waxy oil is sprayed into the column until wax structures are formed to the desired height, i. e., to within a foot or so of the liquid level in the column. After the requisite leaching period, the solution of oil and propane is withdrawn from the bottom of the leaching vessel and is transferred to a second leaching stage or a second leaching column where waxy oil is sprayed into the cold solution until the desired amount of wax structures are formed in the vessel. Simultaneously with the withdrawal of solution from the first stage, fresh solvent is introduced at the top of the column until the oil solvent solution withdrawn from the bottom is displaced with fresh propane. After sufficient time has elapsed for leaching, the solution of oil and propane from the second stage is transferred to a third stage and waxy stock is sprayed into this stage as in the first two stages. Simultaneously with the withdrawal of solution from the second stage, the solution from the first stage is transferred to the second stage and fresh propane is introduced into the first stage. This displacement of solution is continued until all of the stages in the system have been cut-in. When this has occurred, the propane oil solution from the last stage which contains the least washed wax structures is sent to production. The wax structures in the first stage are then substantially free from oil. This vessel is then cut out of the system and the wax removed therefrom. The second stage then becomes the first stage, fresh propane being introduced therein. The solution from the last stage is then transferred to a fresh vessel where it is employed to leach fresh wax structures as before. In practical operations, it is preferable to provide a leaching column in addition to the number of stages desired in the system so that when a leaching column containing substantially oil-free wax structures is cut out of the system, the solution from the last stage may be transferred to the fresh column where it is employed to leach a new batch of wax structures, this last column then representing the last stage in the cycle of operation. The vessel cut out of the system after removing the wax therefrom is then ready for cutting into the system when the wax structures in the first stage of the new cycle is cut out of the system.

It is thus obvious that the wax structures in the first stage of leaching contain wax structures of least oil content and as the stages progress, the wax structures will contain gradually increasing amounts of oil until at the last stage the wax structures contain the greatest amount of oil. Likewise, the oil solvent solution withdrawn from the bottom of the leaching columns contains an increased amount of oil as the stages progress from the first to the last. At the last stage, the oil solvent solution contains the greatest concentration of oil. This solution is passed to production where the solvent is distilled from the dewaxed oil and recovered by compression and cooling and returned to the propane storage tank.

While we have described a more or less intermittent operation of flow of oil solvent solution from one leaching vessel to another, it will be observed that this flow in any cycle of operation may be made continuous by continuously introducing fresh propane into the first stage, continuously withdrawing propane oil solution from the bottom of the leaching vessels in the subsequent stages and introducing it into the succeeding stages and continuously passing the oil solvent solution from the last stage to production.

While we have indicated the use of liquid propane as the leaching solvent, it will be observed that any of the liquefied normally gaseous hydrocarbons may be employed such as ethane, propane, butane, iso-butane, or mixtures thereof such as commercial propane produced by stabilization of natural gasoline. This commercial propane contains about 80% propane; the rest may substantially be ethane and iso-butane. We may also employ such normally liquid hydrocarbon solvents as pentane, hexane, casinghead gasoline, naphtha, or we may employ other solvents such as alcohol, ether, mixtures of alcohol and ether, acetone, benzol, mixtures of acetone and benzol, chlorinated hydrocarbons such as methyl chloride and dichlorethylene. We prefer to use propane, however, since this solvent may be chilled to $-40°$ F. or thereabouts by merely reducing the pressure of the liquid propane under pressure to substantially atmospheric and it has a low solvent power for wax and a sufficiently high solvent power for oil at the operating temperature. It is of low viscosity and is particularly adapted to the leaching process.

It is thus an object of our invention to accomplish dewaxing of waxy oil by spraying the waxy oil into a cold leaching solvent so as to obtain solidification of the waxy oil and subsequently leach the occluded oil from the solidified masses by causing a downflow of the solvent through the wax matrices and withdrawing the oil solvent solution from the bottom of the leaching vessel.

It is a further object of our invention to repeatedly leach wax structures by either continuously or intermittently introducing cold solvent into the top of the leaching vessel and withdrawing dewaxed oil solvent solution from the bottom of the vessel.

It is a further object of our invention to provide a system for separating wax from oils involving a leaching operation wherein a plurality of leaching stages are provided and the oil solvent solution withdrawn from one stage is employed as the leaching solvent in a subsequent stage for leaching oil from wax structures containing a higher oil content than the first or preceding stage.

It is a further object of our invention to provide a continuous process employing a plurality of leaching stages for separating wax from oils.

Other objects and advantages of our invention will be apparent from the following description of the invention taken from the drawing which is not to be considered as limiting our invention.

Referring to the drawing, the waxy stock such as an S. A. E. 20 distillate produced from a Santa Fe Springs crude, is drawn from tank 1 via line 2 and pumped by pump 3 through line 2a controlled by valve 3a through spray head 4a into the first leaching column A. The leaching column is first filled with a leaching solvent, for example liquid propane, at a temperature of $-40°$ F. This is accomplished by pumping liquid propane under superatmospheric pressure at about normal temperatures from propane storage tank 5 via line 6 controlled by valve 7 into propane chiller 9 where a portion of the propane is vaporized by opening valve 11 on line 10. The vaporized propane being released through valve 11 passes through line 10 to compressor 12 where the propane vapors are compressed, then pass through line 14 to condenser 15 where the compressed vapors are reliquefied and returned to propane storage tank 5 via line 16. By reducing the pressure in the chiller 9 to substantially atmospheric, the temperature of the remaining propane will be lowered to substantially −40° F. or −50° F., depending on the purity of the propane. This propane at, say −40° F., is withdrawn from the bottom of chiller 9 via line 17 controlled by valve 18, is passed by pump 19 into the first leaching column A via lines 20a and 22a controlled by valve 21a and 23a, respectively.

When the required amount of propane has been introduced into leaching column A, the waxy oil at an appropriate temperature is sprayed into the vessel. The temperature at which the waxy oil is heated prior to spraying it into the cold leaching solvent will depend upon whether it is desirable to solidify the sprayed waxy particles in the form of cornflake-like shapes or as pellets or discs or even strings upon contact with the cold leaching solvent. We have found it to be desirable to effect the solidification of the sprayed waxy oil droplets as cornflake-like shapes since it requires less time for the leaching solvent to leach the oil from the solidified wax structures although the solidification as pellets, discs or strings is also within the scope of our invention. The solidification of the waxy oil in the cold leaching solvent as cornflake-like shapes may be accomplished by heating the waxy oil to a viscosity of about 350 seconds Saybolt Universal and spraying the waxy oil through a spray head provided with a large number of small nozzles. By introducing the waxy oil into the cold leaching solvent at a higher viscosity, the waxy stock will solidify upon contact with the solvent as pellets, discs or strings. For an S. A. E. 20 waxy distillate obtained from Santa Fe Springs crude oil, we have found the desirable temperature of heating prior to spraying to be about 110° F. This temperature, of course, will vary with other waxy stocks. Also, the temperature of heating will depend somewhat upon the size of nozzles employed in the spray head as will be readily understood by those skilled in the art. The droplets of waxy stock solidifying as cornflake-like particles, pellets, discs, or strings upon striking the cold propane, sink to the bottom of the vessel. The addition of waxy stock is continued until the vessel is filled to the appropriate height with the wax structures, generally within a foot or so of the liquid level in the column. The amount of leaching solvent, i. e., liquid propane and waxy oil introduced into the initial leaching column will depend upon the character of the solvent and waxy oil. We have obtained good results when using liquid propane as the leaching solvent with as low as 3 volumes of the propane to one of the waxy oil in the initial leaching column A. However, by employing larger amounts of propane, say 10 volumes of the propane to one of the oil, the leaching of the oil from the solidified particles of oil and wax will take place more rapidly and also less foaming will be encountered during the addition of the last part of the waxy oil. However, it is not economically desirable to employ more than 10 volumes of the propane due the large capacity of leaching columns required to effect the leaching operation, and to the cost of chilling and recovering additional solvent.

It will be observed that when employing a liquefied normally gaseous hydrocarbon such as liquid propane as the leaching solvent, a portion of the solvent will vaporize immediately upon contact with the relatively warm waxy oil, thus creating a turbulent condition in the column. This is not desirable since the leached wax matrices being fragile are readily disrupted by any substantial agitation into finely dispersed wax particles which are difficult to separate from the oil solvent solution. It is, therefore, preferable to maintain quiescent leaching conditions and to prevent substantial boiling in the column. This may be accomplished by controlling the vaporization of the solvent in the column or by imposing pressure therein. The pressure may be controlled by means of valve 60a on line 61a. If desired, an extraneous gas, such as air, carbon dioxide or other gases which are non-miscible with the materials in the leaching column may be introduced into the column to create a pressure therein and suppress boiling. It is also desirable to prevent infiltration of heat from the outer walls of the leaching column since this causes the liquid propane to boil in the column. One method for preventing this is to jacket the outer walls of the columns and circulate a cold medium through the jacket.

The waxy stock is allowed to remain in contact with the leaching solvent for a period of time, say fifteen minutes to two hours, to allow a substantial quantity of the oil occluded in the wax matrices to be leached by the solvent. At the end of the leaching period, the fresh propane is introduced at the top of the vessel from propane chiller 9 and valves 26a and 23b are opened and the solution is drawn off from the bottom of the first leaching column and transferred by pump 47a through lines 25a and 22b into the second leaching column B. The introduction of solution of solvent and oil into the second leaching column B is continued until substantially all of the solution in column A is displaced with fresh propane, whereupon waxy oil from tank 1 is sprayed via line 2b controlled by valve 3b through spray head 4b, the introduction of waxy oil being continued until the required amount of oil has been introduced into the column B. In the meantime, the wax structures in column A are washed with fresh solvent and this lowers the oil content of the wax structures. When sufficient leaching time has been allowed in column B, the propane oil solution is transferred via the bottom of leaching column B by pump 47b through lines 24b and 25b and 22c controlled by valves 26b and 23c, respectively, into the final leaching column C. Simultaneously therewith, the relatively more diluted propane oil solution from leaching column A is transferred to leaching column B and fresh propane is introduced into leaching column A.

Waxy oil is then introduced into column C via lines 2 and 2c controlled by valve 3c and spray head 4c and the introduction of the waxy oil is continued until the desired amount of oil has been solidified in the column C.

The displacement of propane oil solution in leaching column A is repeated a number of times, depending upon the total number of stages or extraction vessels in the system, say three as shown in the drawing, until finally pure or substantially oil free propane is withdrawn from the bottom of the leaching column. The oil propane solution is then withdrawn from the bottom of the last leaching stage C via pump 47c and lines 24c and 27c controlled by valve 28c and passed through line 29 through filter 30 where entrained traces of wax are removed by the filter and are withdrawn via line 31 controlled by valve 32 to wax storage tank not shown. The clear solution is then passed through line 33 through heat exchanger 34 where the temperature of the clear solution is raised after which the preheated solution passes through line 35 into evaporator 36. The propane in evaporator 36 is vaporized, aided by steam circulating through closed coil 37 and the vaporized propane passing through mist extractor 38 is withdrawn via line 39 controlled by valve 40 and sent through cooler 41 and line 42 to compressor 12, condenser 15 and propane storage tank 5. The wax-free oil is withdrawn from the bottom of the evaporator via line 43 and pumped by pump 44 through valve 45 into dewaxed oil storage tank 46.

As stated above, when the wax matrices have been washed substantially free from oil with fresh liquid propane in the first leaching column, the latter is cut out of the system and the fresh propane is introduced into leaching column B which then becomes the first leaching column. Leaching column D is then cut into the system by filling the vessel with propane oil solution withdrawn from leaching column C via lines 24c and 25c and 22d, controlled by valve 26c and 23d, respectively. This, of course, is accomplished after the solution from column B is transferred to column C and the solution in column B has been displaced with fresh liquid propane. Waxy oil is then sprayed into column D via lines 2 and 2d controlled by valve 3d and spray head 4d. As in the case of column A, when the wax matrices in column B have been washed substantially free from oil, the propane oil solution in column D is passed to the filter via lines 24d, 27d controlled by valves 28d and 29, the filtrate then passing to the evaporator as stated above. The propane oil solution from column B is then transferred to column C and thence to column D, fresh propane being introduced into column C via line 20c controlled by valve 21c and line 22c, controlled by valve 23c. Column C then becomes the first leaching column, B the second and column A, after removing the wax therefrom, becomes the third leaching column.

We have thus described a process for separating wax from oil involving leaching of wax structures wherein a plurality of leaching columns are provided so interconnected that the flow from one leaching column may be diverted from one to the other and the leaching columns are so interconnected that they may be rotated in such manner that a semi-continuous operation may be carried out with the use of an extra leaching column. Also in the above description discontinuous batch leaching is shown. However, the invention is not to be considered as being limited thereto since it embraces continuous flow of leaching solvent from one column to the other, that is, we may operate in such manner that fresh propane is continuously introduced into the first leaching column and concentrated propane oil solution substantially free from wax is withdrawn from the last leaching stage and passed to production. Thus, we may operate in such manner that oil solvent solution may continuously be passed to production. The production of oil propane solution from the last leaching column is controlled by time, for example, if approximately one hour is calculated from the rate of flow of wash propane in the system to be required for displacing the propane oil solution in any of the leaching columns, then the first hours withdrawal of propane solution from the vessel just charged with oil is sent to production, that is, to the solvent recovery unit. The propane solution withdrawn subsequently is then used as wash propane in the second leaching column. If in charging an empty leaching column for a new cycle, all of the propane solution required for leaching and washing the waxy stock for the first time is accumulated in the leaching column before introducing the waxy stock, it is desirable although not necessary to interrupt the flow of wash propane while the waxy stock is being introduced, giving periodic interruptions in the flow of both wash propane and dewaxed propane solution. To avoid interruption in the flow of wash propane, the introduction of waxy stock into the fresh or empty leaching column may be begun after only a part of the propane solution required for filling the leaching column is introduced and the rate of addition of waxy stock be adjusted so that the addition of waxy stock is completed by the time the liquid reaches the proper level.

In order to minimize the amount of entrained wax particles in the solution withdrawn from the bottom of the leaching vessels, we have provided filter beds 48a 48b, 48c, 48d at the bottom of the leaching vessels to hold the leaching wax structure in the column while the propane solution is allowed to wash through it. For this purpose any desirable material may be provided, such as pads of steel wool, broken glass, stones, pebbles, sand, graded aggregate, tile, sawdust, fire brick and/or a canvas filter.

After the washing of the wax structures in any extractor is considered complete and is cut out of the system, the wax structures are then removed from the leaching column and distilled to recover wax and solvent. The removal of the wax structure may be accomplished by introducing a warm liquid into the leaching column via lines 49a, 49b, 49c and 49d to partially or totally melt the wax structure, the melted wax being withdrawn from the bottom of the leaching columns by pumps 47a, 47b, 47c, 47d and valves 50a, 50b, 50c, 50d and passed into line 51 controlled by valve 52 to a recovery system not shown where the liquid employed to melt the wax may be removed by distillation. In another method for removing the wax, the wax structure may be partially disintegrated by mechanical agitation such as by means of scrapers or stirrers built into the extractor or by blowing with propane or other gas. The mix may be transferred from the bottom of the leaching column by means of a screw conveyor, if desired, and this mix may be filtered, centrifuged, or settled to concentrate the wax particles and recover chilled propane suitable for washing other wax structures. The concentrated wax or wax cake may be washed with further quantities of fresh propane to reduce still further the oil content. The use of a continuous drum type filter is preferred for filtering and washing the wax taken out of the leaching columns. The wash propane may be employed for washing other wax structures in keeping with the spirit of the invention.

When employing filter beds in the extraction columns, the wax structures may be removed by first removing as much of the propane liquid as possible through the filter bed without, however, bringing the liquid level below the top edge of the filter bed. The filter is then back blown with propane gas and additional wash propane is introduced at the bottom of the filter bed. The back blowing washes wax out of the filter bed into the wax slurry on the top. The back blowing can be very violent, if desired, in fact so violent that the entire filter bed is blown up into suspension along with the wax in the propane liquid which will have now been brought to a convenient height in the extraction vessel. Upon stopping the violent agitation by blowing, the heavy filter bed material will settle with extreme rapidity, leaving practically all of the wax suspended as a slurry in the propane phase which can then be decanted off at a point just above the top of the filter bed. In this manner, the filter is, therefore, cleaned and ready for another cycle. In beginning a fresh cycle, the first production may be recycled, if cloudy.

In case the mechanical agitation of back blowing is insufficient to bring down the wax structures to a pulp-like form suitable for discharging from the extractor, or in case it is desired to discharge the wax structures from the extractor before back blowing, mechanical devices may be used for reducing the wax structures to a pulp suitable for discharging, a shaft with scrapers and propellors can be mounted as a permanent part of the extraction vessel as will be readily understood by those skilled in the art.

To illustrate the advantages obtainable by carrying out the process of separating wax from oils forming the subject of our invention the following is submitted which, however, is not to be considered as limiting our invention:

An S. A. E. 20 waxy distillate obtained from a Santa Fe Springs crude oil was first heated to a temperature of about 110° F. or about 20° F. above its pour point so that the waxy oil had a viscosity of about 350 seconds Saybolt Universal. The preheated waxy oil was then introduced into three leaching stages in accordance with the foregoing disclosure. Propane at −40° F. was employed as the leaching solvent. The initial ratio of propane to oil employed in the first stage was approximately 3.2 volumes of propane to one of the waxy oil and the total ratio of propane to oil employed in the first stage was 9.3 volumes of propane to one of the waxy oil. The propane oil solution withdrawn from the bottom of the first stage was employed as leaching solvent in the second stage and the propane oil solution withdrawn from the bottom of the second stage was employed in the third stage. The propane oil solution from the third stage was sent to production in accordance with the foregoing disclosure. Upon completion of the run, approximately 86.2% of dewaxed oil was produced having a pour point of −15° F. and an N.P.A. color of 7 to 7½. Approximately 13.8% of wax was recovered having a high melting point of 135° F.

The foregoing description of our invention is not to be taken as limiting since many variations may be made within the scope of the following claims by those skilled in the art without departing from the spirit thereof.

It is claimed:

1. A process for separating wax from wax-oil mixtures which comprises congealing a wax-oil mixture by contact with a relatively large body of solvent maintained at a low temperature which solvent is capable of dissolving oil at the low temperature of operation but not substantial quantities of wax, subsequently extracting the oil in the congealed wax-oil mixture by means of said solvent to leave a wax structure substantially free from oil and withdrawing oil solvent solution from said body at a point where the oil solvent solution in said body has substantially the highest density.

2. A process according to claim 1 in which the solvent comprises a liquefied normally gaseous hydrocarbon.

3. A process according to claim 1 in which the solvent comprises liquid propane.

4. A process according to claim 1 in which the wax-oil mixture is solidified in the shape of pellets, discs, strings or corn-flakes.

5. A process for separating wax from wax-oil mixtures which comprises introducing a wax-oil mixture into a column containing a relatively large body of solvent maintained at a low temperature, which solvent is capable of dissolving oil at the low temperature of operation but not substantial quantities of wax, and congealing the wax-oil mixtures by contact with said solvent, subsequently extracting the oil in said congealed wax-oil mixture by means of said solvent to leave wax structures substantially free from oil and withdrawing oil solvent solution from the bottom of said column.

6. A process as in claim 5 in which the lower portion of the leaching column is provided with a filter bed to support the wax structures and to permit the oil solvent solution to be withdrawn from the bottom of the leaching column substantially free from solidified wax structures.

7. A process fo dewaxing oils which comprises introducing waxy oil into a plurality of leaching columns containing cold leaching solvent to effect solidification of the waxy oil and to produce wax structures, said introduction of waxy oil being continued until wax structures are produced in the column to a predetermined height, introducing fresh cold leaching solvent into the upper portion of the first leaching column, withdrawing oil solvent solution from the bottom of said leaching column and introducing said oil solvent solution into subsequent leaching columns to provide the leaching solvent for leaching oil from wax structures and withdrawing oil solvent solution from the bottom of the last leaching column and separating the solvent from the oil solvent solution withdrawn from said last-mentioned leaching column.

8. A process for dewaxing oils which comprises introducing waxy oil into a plurality of leaching columns containing cold leaching solvent to effect solidification of the waxy oil and to produce wax structures, said introduction of waxy oil being continued until wax structures are produced in the columns to a predetermined height, introducing fresh cold leaching solvent into the upper portion of the first leaching column, withdrawing oil solvent solution from the bottom of said leaching column and introducing said oil solvent solution into subsequent leaching columns to provide the leaching solvent for leaching oil from wax structures and withdrawing oil solvent solution from the bottom of the last leaching column, continuing the introduction of fresh leaching solvent into the first column until substantially all of the oil is leached from the wax structures and then interrupting the introduction of fresh leaching solvent into first leaching column and introducing fresh leaching solvent into the second column, passing the leaching solvent and oil from the last leaching column into an empty leaching column and spraying waxy oil into said solution to effect solidification of waxy oil and withdrawing the waxy oil solution from the bottom of said last mentioned leaching column and removing the wax from said first mentioned leaching column.

9. A process as in claim 8 in which the cold leaching solvent comprises liquefied normally gaseous hydrocarbons.

10. A process as in claim 8 in which the cold leaching solvent comprises liquid propane.

11. A process for dewaxing oil involving a leaching operation in a plurality of stages which comprises leaching solidified wax-oil structures with fresh leaching solvent and employing the leaching solvent containing dissolved oil to leach the oil from the wax-oil structures in a subsequent stage.

12. A process as in claim 11 in which leaching solvent is introduced in the leaching stages at a point where the oil solvent solution has the lowest density and the oil solvent solution in the leaching stages is flowed in a direction of increasing density and the oil solvent solution is withdrawn from the leaching stages at a point where the oil solvent solution has the highest density.

13. A process as in claim 11 in which the leaching solvent is introduced into the upper portion of a column containing the solidified waxy oil structures and is allowed to flow through said waxy oil structures in a downward direction and the oil solvent solution is withdrawn from the lowermost portion of the column.

14. In a process for dewaxing oils involving solidification of waxy oil by contact with a cold leaching solvent, the steps of circulating oil solvent solution from a stage containing wax structures of low oil content to a stage containing wax structures of higher oil content.

ULRIC B. BRAY.
JOSEPH A. CAMPBELL, Jr.